S. R. LAMB.

CALCULATING DEVICE.

APPLICATION FILED DEC. 21, 1909.

Reissued May 27, 1913. 13,569.

Witnesses:-
J. George Barry,
Henry O'Neill.

Inventor:-
Sidney R. Lamb
by his attorneys
Brownscombe

UNITED STATES PATENT OFFICE.

SIDNEY R. LAMB, OF WOODCLIFF LAKE, NEW JERSEY.

CALCULATING DEVICE.

13,569. Specification of Reissued Letters Patent. Reissued May 27, 1913.

Original No. 909,621, dated January 12, 1909, Serial No. 423,054. Application for reissue filed December 21, 1909. Serial No. 534,375.

*To all whom it may concern:*

Be it known that I, SIDNEY R. LAMB, a citizen of the United States, and resident of Woodcliff Lake, in the county of Bergen and State of New Jersey, have invented certain new and useful Improvements in Calculating Devices, of which the following is a specification, containing a full, clear, and exact description, reference being had to the accompanying drawings, forming a part hereof.

My invention relates to a calculating device, particularly adapted for quickly and accurately ascertaining the amount of wages or amounts to be paid to employees, and where the scale of wages and the amount of time of employment varies.

The principal object of my invention is to provide a simple and inexpensive device which can be quickly operated, and which can be readily used in connection with time sheets, or a timekeeper's book.

To the above purposes my invention consists in certain novel features of construction and arrangement of parts, which will be hereinafter more fully set forth, pointed out in the claims, and illustrated in the accompanying drawings, in which;—

Figure 1:
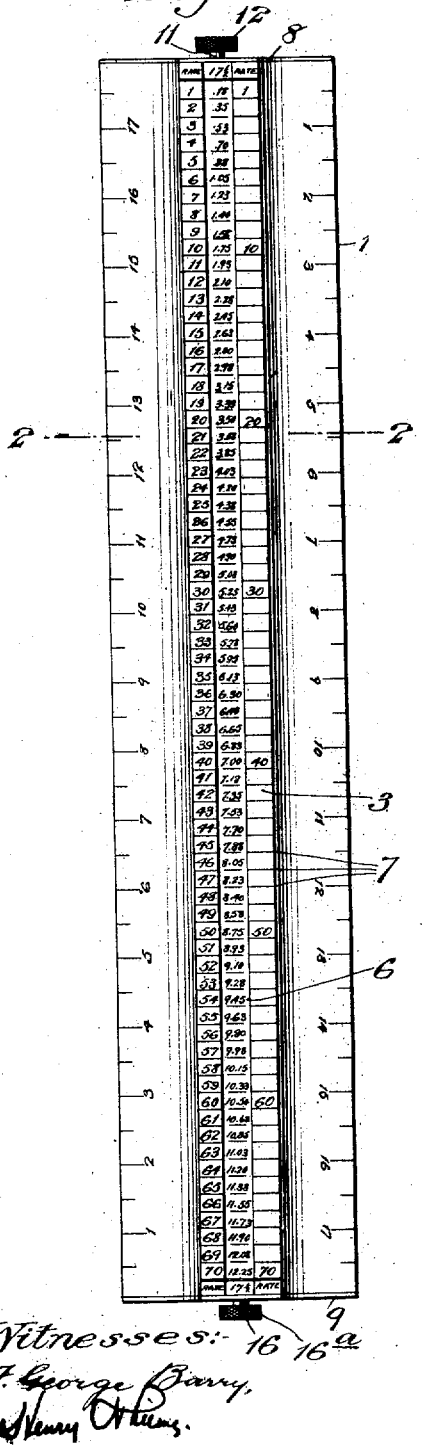
Figure 2:
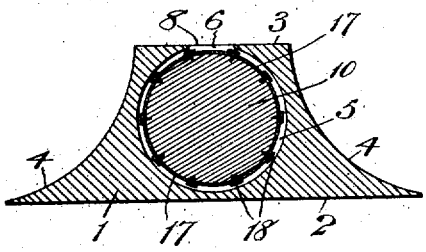
Figure 3:
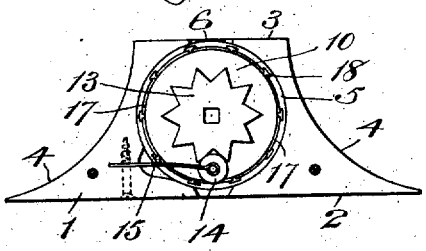
Figure 4:
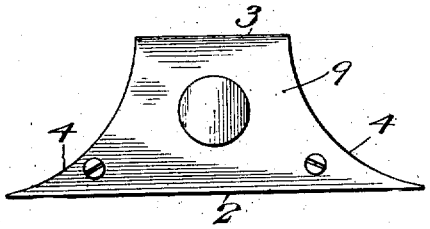

Figure 1 is a plan view of a calculating device of my improved construction; Fig. 2 is a cross section taken on the line 2—2 of Fig. 1; Fig. 3 is an elevation of the lower end of the device, with the end plate removed; Fig. 4 is an end elevation of the device with the plate in position thereon.

Referring by numerals to the accompanying drawings:—1 designates the body of the device, which is an elongated member, having a smooth flat bottom surface 2, and a flat top 3, parallel with said bottom surface; and the bottom of said member being considerably wider than the top thereof, and the edges adjacent the bottom projecting outward, as designated by 4, to form straight edges, or rulers.

Formed through the center of the body 1 is a longitudinally extending opening 5, which is round in cross section, and formed through the top of the body 1 and communicating with said opening 5 is a slot or opening 6. The surfaces on the top of the body 1, to the sides of the slot or opening 6, are divided into equal sized spaces by the transversely disposed lines 7; and said spaces are consecutively numbered beginning with "1" at the top space, and running the entire length of the device. Detachably fixed on the upper end of the body 1 is a plate 8, and detachably arranged on the lower end is a corresponding plate 9.

Arranged for rotation in the opening 5 is a cylinder 10, in the upper end of which is detachably seated a short pin 11, which is journaled in the plate 8, and the outer end of said pin being provided with an operating disk 12. The lower end of the cylinder 10 is provided with a notched wheel 13; and adapted to engage between the teeth thereof is a roller 14, carried on the free end of a leaf spring 15, the opposite end of which is fixed in the body 1. A pin 16 is detachably seated in the lower end of the cylinder 10, which pin is journaled in the end plate 9, and being provided on its outer end with an operating disk 16[a].

Removably applied to the surface of the cylinder 10 and extending the entire length thereof is a series of strips 17, the edges of which are held by keepers 18 seated in the surface of the cylinder; and printed on the surfaces of these strips, in consecutive order, beginning at the top, are amounts which are multiplications of a fixed amount or rate which is the amount per hour received by a certain employee, or employees; and a number of the strips are utilized in order that different totals may be readily ascertained corresponding to different rates or amounts paid the different sets of employese.

As will be readily seen, the strips 17 may be quickly and easily removed and inserted without removing the cylinder 10 from the body 1 by simply taking out one of the detachably seated pins 11 or 16 and removing one of the detachable end plates 8 or 9 and then sliding the strips edgewise off from or on to the cylinder.

In Fig. 1, the strip visible through the opening 6 shows the various amounts to be received by employees receiving 17½ cents per hour; and the time-keeper, or person operating the calculating device, desiring to ascertain the amount due an employee receiving 17½ cents per hour first ascertains the total number of hours of employment of the particular employee, then turns the cylinder 10 in either direction to bring the 17½ cents per hour rate strip into view through the slot or opening 6; and the number appearing on the rate strip directly opposite the total number of hours indicates the total amount due the employee. When the cylinder 10 is rotated in either direction, the roller 14 rides over the teeth of the wheel 13; and when the cylinder has been rotated so as to bring the proper rate strip into view through the opening 6, the roller will engage between a pair of teeth of the wheel, and will thus hold the cylinder in proper position. The cylinder is rotated from either end of the device by engaging either of the disks 12 or 16, and said cylinder is removed from the body 1 by detaching the plate 9.

It will be observed that the elongated body with the opening therein through which the rotary cylinder discloses one of a series of removable longitudinally arranged number-bearing strips may or may not be provided with a scale-bearing straight edge along its bottom.

A calculating device of my improved construction is simple, inexpensive, compact, and is particularly adapted for use by an employer having various sets of employees working at different rates of wages.

I claim:—

1. A calculating device comprising an elongated body, an opening in the body, a cylinder journaled for rotation therein, a portion of which is visible through said opening, a row of numbers on the body adjacent the opening, and a plurality of strips running lengthwise of the cylinder and carrying numbers, and being removably positioned on the cylinder, said elongated body being formed with a thin straight edge at the bottom provided with a scale and adapted to be used as a straight edge.

2. A calculating device comprising an elongated body, an opening in the body, a cylinder journaled for rotation therein, a portion of which is visible through said opening, a row of numbers on the body adjacent the opening, and a plurality of strips running lengthwise of the cylinder, and carrying numbers, and being removably positioned on the cylinder, said elongated body being formed with a thin straight edge at the bottom provided with a scale and adapted to be used as a straight edge and means at the ends of the device to rotate the cylinder.

3. A calculating device comprising an elongated body, an opening in the body, a cylinder journaled for rotation therein, a portion of which is visible through said opening, a row of numbers on the body adjacent the opening, and a plurality of strips running lengthwise of the cylinder and carrying numbers, and being removably positioned on the cylinder, said elongated body being formed with a thin straight edge at the bottom provided with a scale and adapted to be used as a straight edge and means at the end of the cylinder to hold it in a fixed position.

4. A calculating device comprising an elongated body, an opening in the body, a cylinder journaled for rotation therein, a portion of which is visible through said opening, a row of numbers on the body adjacent the opening, and a plurality of strips running lengthwise of the cylinder and carrying numbers, and being removably positioned on the cylinder, said elongated body being formed with a thin straight edge at the bottom provided with a scale and adapted to be used as a straight edge, means at the ends of the device to rotate the cylinder and means at the end of the cylinder to hold it in a fixed position.

5. A calculating device, comprising an elongated horizontal body having a longitudinal cylindrical opening bored therethrough and a slot in its top extending the full length thereof, leading into the said opening, the body being provided with a row of numbers adjacent to the slot, plates secured to ends of the body, a cylinder in the opening of the body and provided with removable strips extending lengthwise thereof and carrying numbers, pins journaled in the end plates and forming bearings for the cylinder and provided with handles at their ends, and yielding means for holding the cylinder from turning and permitting intermittent movement thereof.

6. A calculating device comprising an elongated chambered body having a longitudinal slot or sight opening, a cylinder mounted to rotate within the body, a series of numbers arranged on the body adjacent the sight opening, a plurality of longitudinally arranged number-bearing strips removably positioned on the cylinder, manually operated means for rotating the cylinder to bring different number-bearing strips thereon into position opposite the sight opening, and means at one end of the body formed to release the strips on the cylinder to permit the insertion and removal of the strips without removing the cylinder from the body.

7. A calculating device comprising an elongated horizontal chambered body having a longitudinal slot or sight opening in its top side, a cylinder mounted to rotate within the body, a series of numbers arranged on the body adjacent the sight opening, a plurality of longitudinally arranged number-bearing strips removably positioned on the cylinder, manually operated means for rotating the cylinder to bring different number-bearing strips thereon into position opposite the sight opening, and means at one end of the body formed to release the strips on the cylinder to permit the insertion and removal of the strips without removing the cylinder from the body, said body being formed with a laterally projecting longitudinally extending bottom straight edge.

8. A calculating device comprising an elongated horizontal chambered body having a longitudinal slot or sight opening in its top side, a cylinder mounted to rotate within the body, a series of numbers arranged on the body adjacent the sight opening, a series of longitudinally arranged number-bearing strips on the cylinder, and manually operated means for turning the cylinder to bring different number-bearing strips thereon into position beneath the sight opening, said body being formed with a laterally projecting tapered bottom flange or part forming a longitudinally extending knife edge.

In testimony whereof, I have signed my name to this specification, in presence of two subscribing witnesses, this 20th day of December, nineteen hundred and nine.

SIDNEY R. LAMB.

Witnesses:

F. George Barry,

Henry Thieme.